United States Patent Office 3,389,570
Patented June 25, 1968

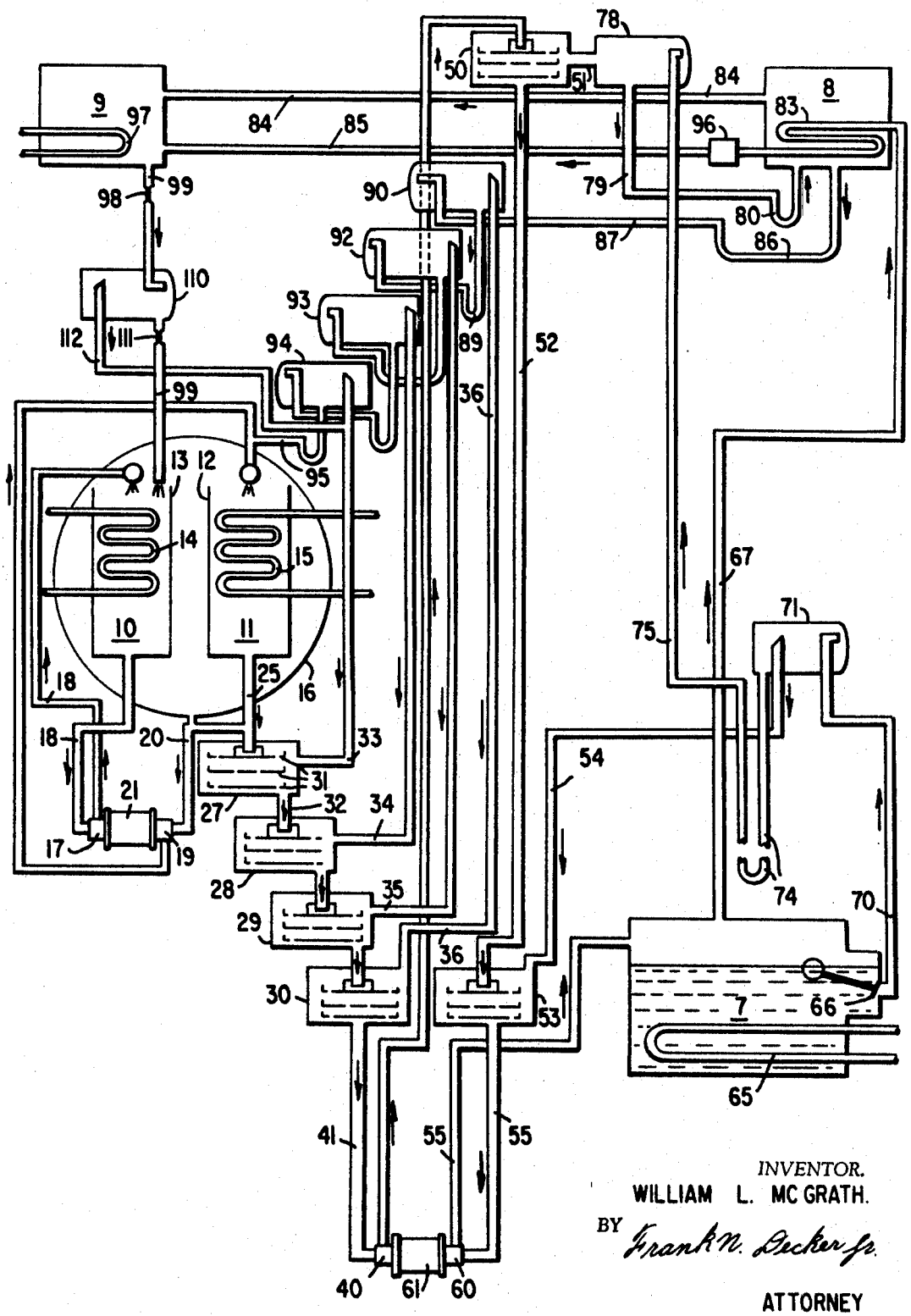

3,389,570
REFRIGERANT CONDENSATE CIRCUIT IN MUL-
TIPLE-EFFECT ABSORPTION REFRIGERATION
SYSTEMS
William L. McGrath, Syracuse, N.Y., assignor to Carrier
Corporation, Syracuse, N.Y., a corporation of Delaware
Filed May 31, 1967, Ser. No. 642,368
5 Claims. (Cl. 62—101)

ABSTRACT OF THE DISCLOSURE

A double-effect absorption refrigeration system having a primary absorber, a primary evaporator, a high pressure generator, a low pressure generator, a high pressure condensing section, and a low pressure condenser, connected to provide refrigeration. A plurality of auxiliary absorber stages are connected in a weak solution line between the primary absorber and the high pressure generator. A plurality of auxiliary evaporator stages are connected in an intermediate solution line between the high pressure generator and the low pressure generator, and a plurality of auxiliary evaporator stages are connected in a strong solution line between the low pressure generator and the primary absorber. Stages of the auxiliary evaporators are connected by refrigerant vapor passages with the auxiliary absorbers so as to simultaneously concentrate and cool absorbent solution leaving the generator while also simultaneously heating and diluting weak solution passing to the generators. A low pressure refrigeratant economizer is employed to evaporate a portion of the refrigerant condensed in the low pressure condenser to cool the remaining refrigerant therein prior to passage to the primary evaporator, and the refrigerant vapor is passed to one of the auxiliary absorbers for absorption therein.

Cross reference to related application

Features of this invention are disclosed in my copending application Ser. No. 642,369 filed concurrently herewith.

Background of the invention

This invention relates to multiple-effect absorption refrigeration systems wherein refrigerant vapor formed in the high pressure generator is condensed in the high pressure condenser section of a low pressure generator to form additional refrigerant vapor, which in turn is condensed in the low pressure condenser. Both the refrigerant condensate formed in the high pressure condenser and that formed in the low pressure condenser is passed to the primary evaporator for evaporation therein.

The liquid refrigerant formed in the high pressure condenser is substantially warmer and at a higher pressure than that formed in the low pressure condenser, which in turn is warmer and at a higher pressure than the liquid refrigerant in the primary evaporator. Previous double-effect absorption refrigeration systems have been troubled by excessive flashing or sudden evaporation of high pressure warm refrigerant liquid entering the primary evaporator.

The flashing of hot refrigerant entering the primary evaporator does not produce useful refrigeration from the system. More important, however, the vapor formed by flashing of the refrigerant must be absorbed into absorbent solution in the absorber and the capacity of the absorber to provide useful refrigeration is thereby reduced. Also, the heat in the flashed vapor must be rejected from the system through the absorber, thereby requiring greater absorber cooling capacity than might otherwise be required. Finally, since the heat of the flashed refrigerant is rejected from the system through the absorber, this heat represents a thermodynamic loss, which it would be desirable to recover.

In accordance with this invention, a double-effect absorption refrigeration system is provided with an improved refrigerant condensate circuit which overcomes the problems and disadvantages previously encountered in passing hot high pressure refrigerant into the primary evaporator.

Summary of the invention

In accordance with this invention, hot high pressure liquid refrigerant from the high pressure condenser is preferably passed directly into the low pressure condenser to evaporate a portion thereof while cooling the remainder. The refrigerant vapor formed by evaporation is then recondensed in the low pressure condenser. The cooled refrigerant from the high pressure condenser, the recondensed vapor, and the refrigerant which is normally condensed in the low pressure condenser, are mixed and passed into a low pressure refrigerant economizer. A portion of the liquid refrigerant in the low pressure refrigerant economizer is evaporated to cool the remaining refrigerant and the refrigerant vapor thus formed is absobed into weak solution passing from the primary absorber to the high pressure generator. The cooled liquid refrigerant is then passed into the primary absorber to produce the desired refrigeration effect.

A refrigeration system in accordance with this invention precools the liquid refrigerant passing into the primary evaporator, thereby greatly reducing the flashing of the refrigerant therein and reducing the nonuseful evaporation of vapor in the evaporator and the quantity of vapor and heat required to be handled by the absorber. The heat extracted from the precooled refrigerant is passed into the weak solution where it serves to preheat and dilute the weak solution, both of which improve the performance of this system. By employing the low pressure condenser to cool some of the high pressure refrigerant liquid, the vapor thus produced is recaptured by being recondensed in the low pressure condenser and is available for evaporation in the primary evaporator.

Brief description of the drawing

The drawing illustrates a schematic cross-section through a double-effect absorption refrigeration system in accordance with a preferred embodiment of this invention.

Description of the preferred embodiment

Referring to the drawing, there is shown a multiple-effect absorption refrigeration system of a type which employs two effects and may use water as a refrigerant and an aqueous solution of hygroscopic salt, such as lithium bromide, as an absorbent. Various additives may be added to the solution, such as 2-ethyl hexanol, to enhance heat transfer, and lithium hydroxide to inhibit corrosion. As used herein "weak" solution refers to a solution weak in absorbent salt and absorbing power, and "strong" solution refers to a solution strong in absorbent salt and absorbing power.

The double-effect absorption system comprises a high pressure generator 7, a low pressure generator 8 having a high pressure condenser section associated therewith, a low pessure condenser 9, a primary absorber 11 and a primary evaporator 10.

Primary evaporator 10 and primary absorber 11 are preferably disposed within a single low pressure shell 16. An internal partition 12 forms a primary absorber chamber and an internal partition 13 forms a primary evaporator chamber within shell 16. A plurality of evaporator heat exchange tubes 14 are arranged within partition 13 for passage of a fluid medium, such as water, to be chilled by the refrigeration system. A plurality of absorber heat exchange tubes 15 are disposed within partition 12 and arranged for passage of a cooling medium, such as water, to a suitable heat rejection location, such as a conventional cooling tower.

Liquid refrigerant is distributed over evaporator tubes 14 and is evaporated to cool the fluid passing through the evaporator tubes. The unevaporated refrigerant liquid passes from the bottom of a sump formed by partition 13 through an evaporator recirculation pump 17 and recirculation passage 18 from which it is again distributed over evaporator tubes 14.

Cool, concentrated, strong absorbent solution is distributed over absorber tubes 15 and cooled by heat exchange with the medium passing therethrough. A portion of the absorbent solution collected in the bottom of a sump formed by partition 12 is recirculated by absorber recirculation pump 19 through recirculation line 20 from which it is again discharged over absorber tubes 15. A single electric motor 21 may operate both pumps 17 and 19.

The absorbent solution in primary absorber 11 is diluted by absorption of refrigerant vapor therein from primary evaporator 10. Cold, moderately weak absorbent solution passes through moderately weak solution passage 25 from the bottom of partition 12 and shell 16 into the first stage 27 of a low pressure auxiliary absorber. From there, the moderately weak solution passes into second stage 28, third stage 29, and fourth stage 30 of the low pressure auxiliary absorber. Each of the stages may be substantially similar and preferably comprises a plurality of perforated liquid distribution pans 31 arranged for cascading flow of liquid from one pan to the succeeding pan throughout each stage. A connecting passage 32 passes solution from first stage 27 to second stage 28 and similar connecting passages are provided between the succeeding stages. A refrigerant vapor inlet passage 33 admits refrigerant vapor to be absorbed into first stage 27, and similar refrigerant vapor inlet passages 34, 35 and 36 admit refrigerant vapor into their respective succeeding stages of the low pressure auxiliary absorber.

A low pressure weak solution pump 40 passes warm weak solution from the last stage 30 of the low pressure auxiliary absorber through weak solution passage 41 to the first stage 50 of a high pressure auxiliary absorber. First stage 50 of the high pressure auxiliary absorber may be similar in construction to first stage 27 of the low pressure auxiliary absorber and is provided with a refrigerant vapor inlet passage 51 to admit refrigerant vapor into the stage for absorption into absorbent solution therein. A connecting passage 52 passes solution from first stage 50 to a second stage 53 of the high pressure auxiliary absorber. Second stage 53 is provided with a refrigerant vapor passage 54 for admitting refrigerant vapor into the stage for absorption into absorbent solution therein. The resulting very weak, very warm, absorbent solution is passed through very weak solution line 55 by very weak solution pump 60 into high pressure generator 7 for concentration therein. Pumps 40 and 60 may be driven by a single electric motor 61.

High pressure generator 7 includes generator heat exchange tubes 65 for passing steam in heat exchange relation with absorbent solution therein. Other heating media may be employed, or alternatively, the generator may be directly fired by a combustable gas. The absorbent solution in generator 7 is boiled to vaporize refrigerant and to concentrate the solution. Hot intermediate strength absorbent solution passes from high pressure generator 7 through float valve 66 and intermediate solution passage 70, to the first stage 71 of a high pressure auxiliary evaporator.

Stage 71 may comprise a hollow vessel in which the incoming solution is discharged against one wall thereof to prevent carryover of liquid droplets into the vapor outlet passage. Refrigerant vapor passage 54 terminates in the vapor space within high pressure auxiliary evaporator stage 71. This passage conducts refrigerant vapor evaporated in high pressure auxiliary evaporator first stage 71 to the last stage 53 of the high pressure auxiliary absorber.

Intermediate solution passes from the first stage 71 of the high pressure auxiliary absorber through a solution trap 74 in passage 75 to second stage 78 of the auxiliary high pressure evaporator, which may be similarly constructed to that of the first stage 71. Refrigerant vapor passage 51 conducts refrigerant vapor from second stage 78 of the auxiliary high pressure evaporator to first stage 50 of the high pressure auxiliary absorber.

Refrigerant vapor is evaporated from the intermediate absorbent solution in the stages of the high pressure auxiliary evaporator, thereby simultaneously concentrating and cooling the hot intermediate strength solution to form moderately hot, concentrated intermediate solution. The concentrated intermediate solution passes through intermediate solution passage 79 and solution trap 80 into low pressure generator 8.

The various solution traps, such as traps 74 and 80, are designed to have a vertical height, such that the level of solution in the leg thereof connecting with the next lower pressure stage, balances the solution level and the pressure difference from the previous higher pressure zone to prevent vapor from passing between the stages.

Low pressure generator 8 comprises a combined generator-condenser and is provided with heat exchange tubes 83 which form a high pressure condenser section therein. The hot refrigerant vapor formed in high pressure generator 7 passes through high pressure refrigerant vapor passage 67 and heat exchange tubes 83 to boil the solution in the lower pressure generator while condensing the vapor within heat exchange tubes 83. The refrigerant vapor formed in the low pressure generator passes through low pressure refrigerant vapor passage 84 to low pressure condenser 9. The strong absorbent solution formed in low pressure generator 8 passes through solution trap 86 and strong solution passage 87 to the first stage 90 of an auxiliary low pressure evaporator. The refrigerant condensed in high pressure condenser tubes 83 passes through steam trap 96 to low pressure condenser 9.

First stage 90 and the succeeding stages of the low pressure auxiliary evaporator may be constructed similarly to first stage 71 of the high pressure auxiliary evaporator. Refrigerant vapor passage 36 extends from the last stage 30 of the low pressure auxiliary absorber and terminates in the vapor space in first stage 90 of the low pressure auxiliary evaporator to conduct refrigerant vapor formed in first stage 90 to last stage 30. The strong absorbent solution passes from first stage 90 of the low pressure auxiliary evaporator through solution trap 89 into second stage 92 in which additional refrigerant is evaporated from the solution. The solution then passes into succeeding stages 93 and 94 where still further evaporation of refrigerant vapor takes place. Second stage 92 of the low pressure auxiliary evaporator is in vapor communication with third stage 29 of the low pressure auxiliary absorber through refrigerant vapor passage 35, and similarly third stage 93 and fourth stage 94 are in communication with second stage 28 and first stage 27, through refrigerant vapor passages 34 and 33 respectively.

The concentrated strong absorbent solution passes from last stage 94 through a solution trap into concentrated strong solution line 95 from which it is discharged over absorber heat exchange tubes 15 in primary absorber 11.

The low pressure refrigerant vapor passes from low pressure refrigerant vapor passage 84 into low pressure condenser 9 and is condensed therein by heat exchange with a suitable cooling medium passing through condenser heat exchange tubes 97. The cooling medium rejects heat from low pressure condenser 9 to a suitable location, such as a cooling tower. Also, high pressure liquid refrigerant passes from high pressure refrigerant liquid passage 85 into low pressure condenser 9, or a similar pressure zone in vapor communication therewith, and is partially evaporated therein by flashing, thereby cooling the remainder thereof upon being discharged in the low pressure condenser. The resulting vapor is recondensed in condenser 9.

Condensed refrigerant passes from low pressure condenser 9 through restriction 98 in low pressure refrigerant passage 99 and is discharged over evaporator heat exchange tubes 14 in primary evaporator 10.

A low pressure refrigerant economizer 110 is disposed in low pressure refrigerant liquid passage 99. Low pressure refrigerant economizer 110 is similar in construction to high pressure auxiliary evaporator stage 71 and vapor formed therein passes through vapor passage 112 and passage 33 into first stage 27 of the low pressure absorber. Low pressure refrigerant restriction 111 and restriction 98 are disposed in the low pressure liquid refrigerant inlet and discharge passages associated with low pressure refrigerant economizer 110 to maintain a pressure zone therein, intermediate the pressures in low pressure condenser 9 and primary evaporator 10. A portion of the low pressure liquid refrigerant is evaporated in low pressure refrigerant economizer 110 to cool the remaining refrigerant prior to its discharge over primary evaporator heat exchange tubes 14. The refrigerant vapor thus formed is absorbed into and dilutes and heats the cold moderately weak solution in first stage 27 of the low pressure auxiliary absorber.

In operation, the pressures in serially connected low pressure auxiliary absorber stages 27, 28, 29 and 30 successively increase in the direction of solution flow therethrough from primary absorber 11 toward the high pressure auxiliary absorber and high pressure generator 7. The low pressure auxiliary absorber stages form successively increasing pressure zones intermediate the pressures in primary absorber 11 and first stage 50 of the high pressure auxiliary absorber.

Similarly, the pressure in second stage 53 of the high pressure auxiliary absorber is greater than the pressure in first stage 50 thereof. Both serially connected stages form successively increasing pressure zones intermediate the pressure in last stage 30 of the low pressure auxiliary absorber and the high pressure generator 7, in the direction of solution flow therethrough from primary absorber 11 to high pressure generator 7.

In a typical system, moderately weak (60%), cold (106° F.), absorbent solution from primary absorber 11 is successively diluted and heated in the stages of the low pressure auxiliary absorber by absorption of refrigerant vapor therein, to form warm (156° F.) weak (58.8%) solution which passes to the high pressure auxiliary absorber. The low pressure refrigerant economizer may operate at a temperature of about 55.5° F. The warm weak solution is successively further diluted and further heated by absorption of refrigerant vapor therein as it passes through the stages of the high pressure auxiliary absorber to form very warm (243° F.), very weak (56.8%) absorbent solution which passes to high pressure generator 7.

The quantity of refrigerant which can be formed by boiling weak solution in the high pressure generator at a given temperature is increased because the solution passed thereto is very weak in absorbent salt. Thus, a low generator temperature becomes feasible by use of this invention. In addition, very weak solution results in less corrosion of metal parts in the high pressure generator than would occur with stronger solution at the same temperature level.

The hot (307° F.) intermediate strength (58.7%) absorbent solution from the high pressure generator is further concentrated as it passes through the high pressure auxiliary evaporators by the evaporation of refrigerant vapor therein. At the same time, not only is the concentration of the solution increased, but its temperature is reduced so that only moderately hot (216° F.) but concentrated (60.9%) intermediate solution passes into the low pressure generator.

The absorbent solution is further cooled and concentrated by evaporation of refrigerant therefrom in the low pressure generator and the moderately cool (195° F.) strong (63.3%) solution is serially passed through the stages of the low pressure auxiliary evaporator. Still further, refrigerant vapor is evaporated from the strong solution in the low pressure auxiliary evaporator stage. Consequently, the solution is further cooled, due to the evaporation of refrigerant therefrom and the cool (146° F.) concentrated (64.5%) strong solution is passed to the primary absorber to absorb refrigerant vapor therein.

From the foregoing description, it will be seen that all of the liquid refrigerant passing from the high pressure condenser and the low pressure condenser to the primary evaporator is cooled in the low pressure refrigerant economizer prior to its passage into the primary evaporator. It has been previously explained that absorption of this vapor together with the latent heat of vaporization contained therein in the weak absorbent solution passing to the high pressure generator significantly improves cycle efficiency by heating and diluting the weak solution prior to passage to the high pressure generator. In addition, precooling of refrigerant liquid in the low pressure economizer greatly reduces excessive flashing in the primary evaporator and minimizes the quantity of entrained refrigerant liquid carried over into the primary absorber. Thus, more refrigerant is available to provide useful cooling capacity in the primary evaporator. Also, less refrigerant vapor need be absorbed by the primary absorb for a given amount of cooling, due to the fact that liquid refrigerant introduced into the primary evaporator is at a lower temperature than that in the low pressure condenser, and consequently, less refrigerant will be flashed in cooling the refrigerant to the evaporator temperature.

It will be appreciated that various modifications of this invention may be made without departing from the scope thereof. If desired, a refrigerant evaporator may be employed in the high pressure refrigerant passage between the high pressure condenser and the low pressure condenser and the refrigerant vapor formed therein may be absorbed in weak solution in a stage of the high pressure auxiliary absorber or may be condensed in the low pressure condenser. Similarly, conventional heat exchangers may be employed in the absorption refrigeration system in place of the high pressure auxiliary evaporators and absorbers, and modifications may be made in the physical arrangement of components, if desired. Also the absorption refrigeration system may utilize more than two effects and consequently the terms "high pressure," "low pressure," "strong," "weak" and "intermediate" and other similar terms are used merely for clarity to distinguish relative relationship of the components, solutions, temperatures or pressures and not as a limitation on the number of effects in the cycle.

Accordingly, this invention may otherwise be embodied in the scope of the following claims.

I claim:
1. An absorption refrigeration system comprising:
 (A) a primary absorber;
 (B) a primary evaporator;
 (C) a high pressure generator;
 (D) a low pressure generator having a high pressure condenser section associated therewithin;
 (E) a low pressure condenser;
 (F) weak solution passage means for passing weak absorbent solution from said primary absorber to said high pressure generator for concentration therein;
 (G) intermediate solution passage means for passing intermediate strength absorbent solution from said high pressure generator to said low pressure generator for further concentration therein;
(H) strong solution passage means for passing strong absorbent solution from said low pressure generator to said primary absorber for absorption of refrigerant vapor therein;
(I) high pressure refrigerant vapor passage means for passing high pressure refrigerant vapor formed in said high pressure generator through the high pressure condenser section of said low pressure generator for condensing said vapor and heating solution in said low pressure generator;
(J) low pressure refrigerant vapor passage means for passing low pressure refrigerant vapor formed in said low pressure generator to said low pressure condenser for condensing said vapor;
(K) refrigerant vapor passage means for passing evaporated refrigerant from said primary evaporator to said primary absorber for absorption into absorbent solution;
wherein the improvement comprises:
(L) high pressure refrigerant liquid passage means for passing high pressure liquid refrigerant condensed in the high pressure condenser section of said low pressure generator into a low pressure zone in communication with said low pressure condenser, for evaporating a portion of said liquid refrigerant in said low pressure zone to cool the remainder thereof, and for condensing the evaporated refrigerant portion in said low pressure condenser;
(M) an auxiliary absorber, disposed in said weak solution passage, having a pressure therein intermediate the pressures in said primary absorber and said high pressure generator;
(N) a low pressure refrigerant economizer, disposed in the low pressure refrigerant liquid passage between said low pressure condenser and said primary evaporator to receive refrigerant condensed in said low pressure condenser for evaporating a portion of the refrigerant therein to cool the remaining refrigerant liquid, said low pressure refrigerant economizer having a pressure therein intermediate the pressures in said low pressure condenser and said primary evaporator and substantially the same as the pressure in said auxiliary absorber;
(O) low pressure refrigerant liquid passage means for passing refrigerant liquid condensed in said high pressure condenser from said low pressure zone to said low pressure refrigerant economizer; and
(P) refrigerant vapor passage means connecting said refrigerant economizer and said auxiliary absorber for passing refrigerant vapor evaporated in said refrigerant economizer to said auxiliary absorber for absorption therein to thereby heat and dilute the week solution in said auxiliary absorber prior to passage thereof to said high pressure generator.

2. An absorption refrigeration system as defined in claim 1 wherein said low pressure zone to which high pressure refrigerant is passed from said high pressure condenser comprises said low pressure condenser, the refrigerant condensed in said low pressure condenser being mixed therein with liquid refrigerant condensed in said high pressure condenser, and passing therewith from said low pressure condenser to said low pressure refrigerant economizer.

3. An absorption refrigeration system comprising:
(A) a primary absorber;
(B) a primary evaporator;
(C) a high pressure generator;
(D) a low pressure generator having a high pressure condenser section associated therewithin;
(E) a low pressure condenser;
(F) weak solution passage means for passing weak absorbent solution from said primary absorber to said high pressure generator for concentration therein;
(G) intermediate solution passage means for passing intermediate strength absorbent solution from said high pressure generator to said low pressure generator for further concentration therein;
(H) stong solution passage means for passing strong absorbent solution from said low pressure generator to said primary absorber for absorption of refrigerant vapor therein;
(I) high pressure refrigerant vapor passage means for passing high pressure refrigerant vapor formed in said high pressure generator through the high pressure condenser section of said low pressure generator for condensing said vapor and heating solution in said low pressure generator;
(J) low pressure refrigerant vapor passage means for passing low pressure refrigerant vapor formed in said low pressure generator to said low pressure condenser for condensing said vapor;
(K) refrigerant vapor passage means for passing evaporated refrigerant from said primary evaporator to said primary absorber for absorption into absorbent solution;
wherein the improvement comprises:
(L) high pressure refrigerant liquid passage means for passing high pressure liquid refrigerant condensed in the high pressure condenser section of said low pressure generator into said low pressure condenser for evaporating and recondensing a portion thereof while mixing with low pressure refrigerant condensed in said low pressure condenser, thereby cooling said refrigerant liquid; and
(M) low pressure refrigerant liquid passage means for simultaneously passing the refrigerant condensed in said high pressure condenser and the refrigerant condensed in said low pressure condenser from said low pressure condenser to said primary evaporator for evaporation therein.

4. A method of producing refrigeration from an absorption refrigeration system having a primary absorber, a primary evaporator, a high pressure generator, a low pressure generator associated with a high pressure condenser, and a low pressure condenser, operatively connected to form a multiple effect absorption refrigeration system, the steps comprising:
(A) evaporating refrigerant in the primary evaporator to provide cooling, and absorbing the evaporated refrigerant in an absorbent solution in said primary absorber, thereby forming weak absorbent solution;
(B) heating said weak absorbent solution in the high pressure generator to form intermediate strength absorbent solution and high pressure refrigerant vapor;
(C) heating intermediate strength solution in said low temperature generator by condensing high pressure refrigerant vapor in said high pressure condenser in heat exchange relation with intermediate strength solution in said low pressure generator to form strong absorbent solution and low pressure refrigerant vapor;
(D) condensing said low pressure refrigerant vapor in said low temperature condenser;
(E) passing said strong solution to said primary absorber for reabsorption of refrigerant vapor;
wherein the improvement comprises:
(F) evaporating a portion of said high pressure liquid refrigerant in a low pressure zone to cool the remainder of said liquid refrigerant therein;
(G) condensing the portion of said refrigerant evaporated in said low pressure zone in said low pressure condenser;
(H) mixing the remainder of refrigerant condensed in said high pressure condenser with the refrigerant condensed in said low pressure condenser, and passing the mixed liquid refrigerant to said primary evaporator for evaporation therein;

(I) evaporating a portion of the mixed liquid refrigerant passing to said primary evaporator, prior to passage thereof to said primary evaporator, in an evaporating zone having a pressure intermediate the pressures in said low pressure condenser and said primary evaporator, thereby cooling the remaining liquid refrigerant; and (J) absorbing the refrigerant vapor evaporated in said evaporating zone in weak solution passing from said primary absorber to said high pressure generator in an absorbing zone having a pressure intermediate the pressures in said primary absorber and said high pressure generator and having a pressure substantially equal to the pressure in said evaporating zone, thereby heating and diluting weak solution passing from said primary absorber prior to passing into said high pressure generator.

5. A method of producing a refrigeration from an absorption refrigeration system having a primary absorber, a primary evaporator, a high pressure generator, a low pressure generator associated with a high pressure condenser, and a low pressure condenser, operatively connected to form a multiple-effect absorption refrigeration system, the steps comprising:

(A) evaporating refrigerant in the primary evaporator to provide cooling, and absorbing the evaporated refrigerant in an absorbent solution in said primary absorber, thereby forming weak absorbent solution;

(B) heating said weak absorbent solution in the high pressure generator to form intermediate strength absorbent solution and high pressure refrigerant vapor;

(C) heating intermediate strength solution in said low temperature generator by condensing high pressure refrigerant vapor in said high pressure condenser in heat exchange relation with intermediate strength solution in said low pressure generator to form strong absorbent solution and low pressure refrigerant vapor;

(D) condensing said low pressure refrigerant vapor in said low temperature condenser;

(E) passing said strong solution to said primary absorber for reabsorption of refrigerant vapor;

wherein the improvement comprises:

(F) passing high pressure liquid refrigerant condensed in said high pressure condenser to said low pressure condenser;

(G) evaporating a portion of said high pressure liquid refrigerant in said low pressure condenser to cool the remainder of said refrigerant therein;

(H) recondensing in said low pressure condenser the portion of said refrigerant evaporated in said low pressure condenser;

(I) mixing the refrigerant condensed in said high pressure condenser with the refrigerant condensed in said low pressure condenser, in said low pressure condenser; and (J) passing the mixed liquid refrigerant to said primary evaporator for evaporation therein.

References Cited

UNITED STATES PATENTS

| | | | |
|---|---|---|---|
| 2,755,635 | 7/1956 | Bourne | 62—101 |
| 3,273,350 | 9/1966 | Taylor | 62—101 |
| 3,292,385 | 12/1966 | Murray | 62—101 |
| 3,316,727 | 5/1967 | Bourne | 62—101 |

LLOYD L. KING, *Primary Examiner.*